United States Patent [19]

Schnur et al.

[11] 4,430,096
[45] Feb. 7, 1984

[54] PROCESS FOR THE PRODUCTION OF GAS MIXTURES CONTAINING HYDROGEN AND CARBON MONOXIDE VIA THE ENDOTHERMIC PARTIAL OXIDATION OF ORGANIC COMPOUNDS

[75] Inventors: Friedrich Schnur, Oberhausen; Boy Cornils, Dinslaken; Josef Hibbel, Oberhausen; Bern-Hard Lieder, Bottrop, all of Fed. Rep. of Germany

[73] Assignee: Ruhrchemie Aktiengesellschaft, Oberhausen, Fed. Rep. of Germany

[21] Appl. No.: 272,857

[22] Filed: Jun. 12, 1981

Related U.S. Application Data

[63] Continuation of Ser. No. 42,750, May 29, 1979, abandoned.

[30] Foreign Application Priority Data

May 26, 1978 [DE] Fed. Rep. of Germany ....... 2822862

[51] Int. Cl.³ .............................. C10J 3/46; C10J 3/54
[52] U.S. Cl. .................................... 48/206; 48/197 R; 48/DIG. 2; 252/373
[58] Field of Search .................... 48/197 R, 200, 201, 48/206, 213, 214 R, 215, 205, DIG. 2; 252/373

[56] References Cited

U.S. PATENT DOCUMENTS

| 2,767,233 | 10/1956 | Mullen et al. ......................... 48/215 |
| 2,987,387 | 6/1961 | Carkeek et al. ....................... 48/206 |
| 3,000,711 | 9/1961 | Eastman et al. ...................... 48/206 |
| 3,010,813 | 11/1961 | Clarke et al. ..................... 48/197 R |
| 4,054,424 | 10/1977 | Staudinger et al. ............ 48/DIG. 2 |
| 4,056,483 | 11/1977 | Baron et al. .......................... 48/206 |

Primary Examiner—Peter F. Kratz
Attorney, Agent, or Firm—Sprung, Horn, Kramer & Woods

[57] ABSTRACT

An improved process for the production of a gas mixture containing hydrogen and carbon monoxide by endothermal partial oxidization of an organic compound with steam and/or carbon dioxide is disclosed wherein at least a portion of the heat required for the partial oxidation is obtained by direct heat exchange with products obtained from the gasification of a carbonaceous ash-forming fuel with oxygen in the presence of steam.

12 Claims, 1 Drawing Figure

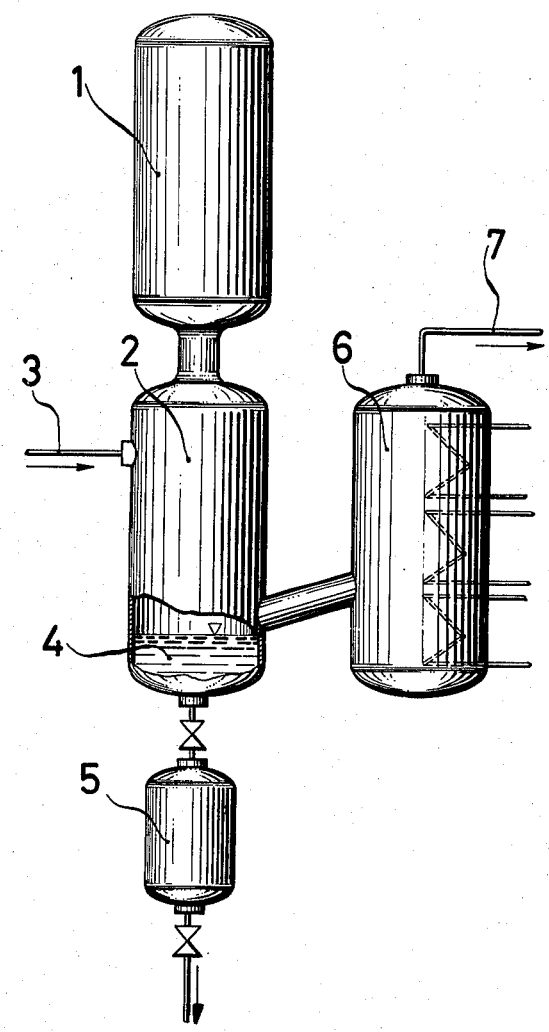

PROCESS FOR THE PRODUCTION OF GAS MIXTURES CONTAINING HYDROGEN AND CARBON MONOXIDE VIA THE ENDOTHERMIC PARTIAL OXIDATION OF ORGANIC COMPOUNDS

This is a continuation of application Ser. No. 042,750, filed May 29, 1979 now abandoned.

BACKGROUND OF THE INVENTION

1. Field of the Invention

This invention relates to the production of gas mixtures containing hydrogen and carbon monoxide by endothermal partial oxidation (cracking) of organic compounds with steam and/or carbon dioxide at temperatures of about 900° to about 1500° C. and pressures up to 200 bar. This invention is concerned with the recovery of heat from the gasification of carbonaceous fuels in the formation of carbon monoxide and hydrogen to supply heat for the endothermal partial oxidation of organic compounds.

2. Discussion of the Prior Art

The endothermic thermal or catalytic cracking of organic compounds, especially of hydrocarbons in the presence of water and/or carbon dioxide to carbon monoxide and hydrogen is an established reaction which is operated industrially using various processes. The process can ensue in tubular reactors, the necessary heat of reaction being supplied via heat transport through the walls of the tubes or in a medium of externally heated solid heat exchanger, e.g., fine grained solids which are used in fluidized beds.

All processes necessitate involved process technology and exhibit comparatively low thermal efficiency.

In the autothermic cracking of organic compounds, the necessary thermal energy is supplied by the process itself via partial combustion of the organic feedstock. This technique is also technically involved as well as requiring oxygen.

The object of the invention is to facilitate the endothermic cracking of hydrocarbons under technically simpler conditions and in a more economical manner thereby enabling the cracking of the carbon compounds with an optimal union of heat and materials in those processes for the manufacture of synthesis gas from carbonaceous ash-forming fuels.

SUMMARY OF THE INVENTION

The objects of this invention are provided, in accordance with this invention which provides an improved process for the production of a gas mixture containing hydrogen and carbon monoxide by endothermal partial oxidation of an organic compound with steam and/or carbon monoxide at a temperature between about 900° to 1600° C., preferably 900° to 1000° C. and at a pressure of up to 200 bar, the improvement residing in that at least a portion of the heat required for said partial oxidation is obtained by direct heat exchange with the products obtained from the gasification of a carbonaceous ash-forming fuel with oxygen or an oxygen containing gas mixture in the presence of steam. As a result of the process, carbon monoxide and hydrogen are produced at temperatures above the ash-melting point and at pressures up to 200 bar. They can also be formed at atmospheric pressure. By-products and waste products from chemical sythesis can be employed as the organic compound to be endothermally partially oxidized. By the process of the invention, large quantities of hydrogen and carbon monoxide are formed in a process which maximally utilizes heat which is supplied and/or developed.

In view of the depletion of the oil reserves, the gasification of carbonaceous, ash-forming fuels to synthesis gas—a feedstock for many heavy chemicals—is a subject of growing interest.

The following carbonaceous, ash-forming fuels are particularly suitable as feedstock for the process according to the invention—hard coal, lignite, solid and liquid carbon-containing residues, e.g., residues from the coal hydrogenation and soot from oil gasification processes.

The gasification of carbonaceous feedstocks can take place according various established processes.

These processes include all coal gasification variants especially those in which pulverized or dust-like coal is employed. The fluidized-bed processes comprise, for example, the Winkler, the dust gasification processes according to Koppers-Totzek, Krupp-Koppers or Shell-Koppers, Texaco, Rummel-Otto, Ruhrgas fluidized-bed Babcock & Wilcox/Dupont or Lurgi-Ruhrgas process. Modern multi-step processes are also suitable. A comprehensive survey of the processes can be found in "Chemierohstoffe aus Kohle", editor J. Falbe, Thieme Verlag, Stuttgart (1977); the disclosure of which is hereby incorporated specifically herein by reference.

The gasification of pulverized or possibly dust-like fuels is particularly important at temperatures around 900° to roughly 1600° C. preferably 1100° to 1500° C. and raised pressures up to 200 bar, preferably 5 to 100 bar. Coal is particularly suitable as the pulverized or dust-like solid fuel, as modern mechanized mining technology leads to the production of an increasing amount of dust-like coal. This type of coal can be readily metered and transported using a liquid medium. In addition, almost all types of coal dust, independent of baking tendency and ash content, can be converted into synthesis gas.

The Texaco process will now be described as a typical example of a coal gasification process utilizing finely divided coal. In this process, pre-crushed coal is ground in a mill to a grain size below 0.1 mm and fed to a suspension vessel. On introducing fresh and recycle water, a stable, pumpable slurry results with a solid content between 55 and 60% coal. The coal slurry is then brought up to pressure by means of a pump and fed to the burner at the top of the gasifier.

The coal-water suspension is gasified in the presence of oxygen at temperatures above 1400° C. The reaction chamber is provided with a refractory lining. Cooling of the reactor casing is not required and only the burner is water-cooled.

The liquid ash resulting at high temperatures is transported with the gas to a separating chamber where the ash falls into a water bath which is usually an integral part of this chamber. The ash is granulated to a fine slag and discharged via a lock system.

The hot raw gas is then fed to a heat recovery system where it is cooled to roughly 200° C. The heat released in this process is used for steam generation.

The raw gas is further cooled in a scrubber-cooler on injecting water and, in addition, the fine coal and ash particles are removed. The wash water is roughly clarified in a settler and recycled to the scrubber-cooler.

As a consequence of the high gasification temperature, the resulting synthesis gas contains only small amounts of tars, thereby eliminating the necessity of using expensive purification steps. Raised pressure, high temperature and a finely divided coal feed lead to a high degree of conversion and relative to the volume of the gasification chamber, they effect a high gasification efficiency. In the majority of plants in which synthesis gas is converted into products such as ammonia, Oxo compounds, methanol or products from the Fischer-Tropsch synthesis or the coal hydrogenation and which operate under pressure, a considerable part of the investment required for the compression can be saved on gasifying carbonaceous, ash-forming fuels under pressure. Compared to the established coal gasification processes in which lumpy coal is employed or which operate under normal pressure, the pressure gasification of finely divided coal permits a considerable saving in the manufacturing costs of synthesis gas.

A requirement for the technically smooth and economic operation of the pressure gasification using carbonaceous, ash-forming fuels of high thermal efficiency is a rapid cooling and separation of the mixture from the synthesis gas. The latter leaves the reactor at a temperature of 100° to 1500° C. and the light liquid ash droplets are deposited on lowering the temperature below the ash-melting point. In this way, the synthesis gas is freed from fine ash. The ash is separated in the usual manner, for example, by quenching, immersion, feeding the total gas stream through a water bath or cooling with cold recycle gas. A disadvantage of this purification process is the more or less great loss of the heat content of the resulting synthesis gas (entropy loss) and thus, the reduction in the thermal efficiency of the total process.

The new process avoids these drawbacks in that an endothermic reaction—the partial oxidation of organic compounds with steam and/or carbon dioxide—is used to cool the mixture of synthesis gas and liquid ash. This causes the ash to be deposited in the solid state.

In accordance with the object of the process of the invention, on leaving the gasifier the raw synthesis gas is immediately brought into contact with the organic compounds to be cracked with steam and/or carbon dioxide, i.e., preferably in the above mentioned separation chamber which is constructed as a mixing and separating chamber.

With the new procedure, one can conduct the gasification of solid or liquid fuels, preferably under pressure, with optimal heat recovery in the waste heat system while utilizing the highest possible temperature gradient. There is no blockage or baking in the units which are located after the gasifier, especially in the apparatus for recovering the waste heat. The endothermic reaction of the charge consisting of organic compounds or mixtures of compounds has a cooling effect on the synthesis gas and the light liquid ash. In this manner, a temperature below the ash melting point is reached leading to a deposition of solid ash particles. In addition, the new process leads to the formation of an increased amount of synthesis gas as carbon monoxide and hydrogen result from the endothermic reaction between the organic compounds with water or carbon dioxide.

Hydrocarbons or oxygen-containing organic compounds are particularly suitable as organic compounds to be converted into carbon monoxide and hydrogen via the endothermic partial oxidation with steam or carbon dioxide. Some examples are—methane, ethane, ethylene, propane, propylene, butane, butylenes, methanol, ethanol, propanol, formaldehyde, acetaldehyde, propionaldehyde, butyraldehyde, acetone, methyl ethyl ketone, diethyl ketone, dipropyl ketones, dimethyl ether, methyl ethyl ether, diethyl ether, propyl formate, butyl formate, formic acid, acetic acid, propionic acid, phenols (aromatic hydroxy compounds) of every kind. They are reacted either alone or as a mixture of any quantitative and qualitative content.

This summary shows that the endothermic cracking is particularly suitable for the by-products of those synthesis where synthesis gas is used as feedstock. For example, in the Fischer-Tropsch synthesis lower hydrocarbons or oxygen-containing compounds are obtained as by-products. Ethers and other oxygen-containing compounds are formed during the methanol synthesis, while branched aldehydes and hydrocarbons result as by-products of the olefin hydroformylation.

Thus, the combination of the gasification with a chemical synthesis is of particular interest. If the non-required or undesired by-products are recycled on removal from the synthesis stage to the mixing and separating stage of the gasifier to produce hydrogen and synthesis gas, then the yields relative to the carbon feed and the thermal efficiency of the combined processes will be markedly increased.

The Fischer-Tropsch synthesis can be taken as an example. The plant consists of a synthesis gas production unit, the actual Fischer-Tropsch synthesis and the stage for processing the products. The process control as well as the total yield of value products and the thermal efficiency can be markedly improved when, in accordance with the process of the invention, the undesired low boiling by-products of the synthesis, e.g., methane as well as $C_2$— and part of the $C_3$ hydrocarbons, are recycled with water and/or carbon dioxide to the mixing and separation zone of the gasifier where they are converted via an endothermic reaction to carbon monoxide and hydrogen. While the thermal efficiency of the combined coal gasification, synthesis and final processing steps (including the energy requirements of the conventional process), i.e., without recycling the Fischer-Tropsch by-products, amounts to roughly 44%, the thermal efficiency of the process of the invention increases to roughly 52% on recycling the by-products. There is a similar situation with oxygen-containing by-products of the Fischer-Tropsch synthesis, in particular with lower aldehydes and alcohols.

Utilizing the heat content of the synthesis gas leaving the gasifier, which can be at a temperature up to 1500° C., increases not only yield of desired products on cracking the worthless by-products to carbon monoxide and hydrogen, but also considerably simplifies the process operation. The endothermic cracking of the carbon-containing compounds can still ensue at a sufficient rate at 900° C. The advantage of this in situ cooling with a simultaneous increase in yield can be so great that, for example, in the case of the Fischer-Tropsch synthesis, the carbon monoxide component of the residual gas is converted into methane which can be readily separated from nitrogen and, in accordance with the process of the invention, be then recycled to the gasification stage.

Similar positive results are achieved with all syntheses with carbon monoxide or a synthesis gas feedstock or in hydrogenation processes. The significance of the invention is therefore not limited to the combination of synthesis gas production with the Fischer-Tropsch-synthesis. It also encompasses in the same way the union of synthesis gas production with the methanol synthesis, Oxo synthesis or other processes which are based on a carbon monoxide or a carbon monoxide and hydrogen feed. The same applies to processes for the hydrogenation of coal under pressure where the hydrogen for the hydrogenation is produced by partial oxidation of fuels, especially coal or solid-containing high boiling hydrocarbon fractions which are obtained from the coal hydrogenations. It is also advantageous to recycle the lower hydrocarbons or phenols from the hydrogenation process or from the make-up stages of the hydrogenation process to the thermal cracking.

It is particularly worth mentioning that, the process according to the invention, does not merely permit the utilization of the by-products from chemical synthesis but also the use of carbon dioxide which always results from the autothermic gasification of fuels.

The endothermic cracking of organic compounds can occur at temperatures as low as 900° C. Thus, the quantity of the organic compounds and therefore also the quantity of water and/or carbon dioxide is determined by the temperature of the synthesis gas leaving the reactor. For each gram-atom of carbon of the organic compound, at least 3 moles—usually 4 to 6 moles—of water and/or carbon dioxide are introduced.

BRIEF DESCRIPTION OF DRAWING

In the annexed drawing there is shown a diagramatical respresentation of the apparatus for carrying out the invention in which one of the vessels is partially broken away.

DESCRIPTION OF SPECIFIC EMBODIMENT

The apparatus shown in attached diagram is suitable for conducting the process according to the invention. This apparatus consists of a gasifier 1 and a connected mixing and separating chamber 2. The compounds to be endothermally cracked (organic compounds) are fed to the mixing and separating stage via a pipe 3. In order to avoid deposition of soot at the feeding section, steam and/or carbon dioxide is introduced together with the compounds to be endothermally cracked. It is particularly advantageous to preheat the components to be endothermally cracked together with steam and/or carbon dioxide before they enter the mixing and separating zone. Due to the heat consumption in the mixing and separating stage, the light liquid slag droplets solidify and are deposited in a water bath 4. The ash is then removed via an ash lock 5. At this stage the hot synthesis gas, which is virtually free of ash particles, is fed to a conventional convection boiler 6 connected to the mixing separation zone. These measures ensure that no deposits occur in the convection boiler which would reduce the heat transfer or cause erosion.

The extent of the increase in thermal efficiency and yield of value products in connected plants—which according to the invention consist of gasification and synthesis units—depends on the prevailing conditions, in particular on reaction conditions, synthesis products and the efficiency of the heat and product recovery plants.

What is claimed is:

1. A process for the production of gas mixtures containing hydrogen and carbon monoxide which comprises:
    A. gasifying an ash-forming solid carbonaceous fuel with oxygen or an oxygen containing gas mixture in the presence of steam in a gasifier; and
    B. removing liquid ash from said gasifier by entraining it in the gaseous mixture formed in said gasifier and feeding the gasified products of step A including liquid ash contained therein to a vessel into which a partially oxidizable organic compound is fed together with steam and/or carbon dioxide and therein contacting the gaseous effluent and liquid ash with steam and/or carbon dioxide introduced with said organic compound while maintaining said vessel at a temperature of 900° to 1600° C. at a pressure up to 200 bar; said contacting resulting in the cracking of the organic compound and causing the liquid ash to deposit in the solid state and recovering said ash in the solid state, and wherein said vessel contains a water bath located below the location where said contacting occurs to recover the solidified ash from the gaseous effluent.

2. A process according to claim 1 wherein the carbonaceous ash-forming fuel is finely divided coal.

3. A process according to claim 1 wherein said gasification is effected at a temperature of 1100° to 1500° C. at a pressure of 5 to 10 bar.

4. A process according to claim 1, wherein the compound to be endothermally oxidized is preheated together with steam and/or carbon dioxide before being introduced into the separating zone.

5. A process according to claim 1 wherein the organic compound to be endothermally partially oxidized is a saturated or unsaturated hydrocarbon of 1 to 3 carbon atoms.

6. A process according to claim 1 wherein the organic compound is obtained by the Fischer-Tropsch synthesis, the Oxo synthesis or is methanol.

7. A process according to claim 1, wherein said ash-forming fuel is finely divided coal.

8. A process according to claim 1, wherein said organic compound is selected from the group consisting of methane, ethane, ethylene, propane, propylene, butane, butylene, methanol, ethanol, propanol, formaldehyde, acetaldehyde, propionaldehyde, butyraldehyde, acetone, methyl ethyl ketone, diethyl ketone, dipropyl ketones, dimethyl ether, methyl ethyl ether, diethyl ether, propyl formate, butyl formate, formic acid, acetic acid, propionic acid and phenols.

9. A process according to claim 8, wherein said organic compound is selected from the group consisting of methanol, ethanol, propanol, formaldehyde, acetaldehyde, propionaldehyde, butyraldehyde, acetone, methyl ethyl ketone, diethyl ketone, dipropyl ketones, dimethyl ether, methyl ethyl ether, diethyl ether, propyl formate, butyl formate, formic acid, acetic acid, propionic acid and phenols.

10. A process according to claim 1, wherein said organic compound is fed together with carbon dioxide into said vessel.

11. A process according to claim 10, wherein said partially oxidizable organic compound is selected from the group consisting of methane, ethane, ethylene, propane, propylene, butane, butylene, methanol, ethanol, propanol, formaldehyde, acetaldehyde, propionaldehyde, butyraldehyde, acetone, methyl ethyl ketone, diethyl ketone, dipropyl ketones, dimethyl ether, methyl ethyl ether, diethyl ether, propyl formate, butyl formate, formic acid, acetic acid, propionic acid and phenols.

12. A process according to claim 10, wherein said organic compound is selected from the group consisting of methanol, ethanol, propanol, formaldehyde, acetaldehyde, propionaldehyde, butyraldehyde, acetone, methyl ethyl ketone, diethyl ketone, dipropyl ketones, dimethyl ether, methyl ethyl ether, diethyl ether, propyl formate, butyl formate, formic acid, acetic acid, propionic acid and phenols.

* * * * *